United States Patent
Greb et al.

(10) Patent No.: US 8,825,446 B2
(45) Date of Patent: Sep. 2, 2014

(54) INDEPENDENTLY BASED DIAGNOSTIC MONITORING

(75) Inventors: Karl Friedrich Greb, Missouri City, TX (US); Sunil Oak, Sugar Land, TX (US); Gerhard Michael Wenderlein, Bavaria (DE)

(73) Assignee: Texas Instruments Incorporated, Dallas, TX (US)

( * ) Notice: Subject to any disclaimer, the term of this patent is extended or adjusted under 35 U.S.C. 154(b) by 367 days.

(21) Appl. No.: 13/330,664

(22) Filed: Dec. 19, 2011

(65) Prior Publication Data
US 2012/0166880 A1 Jun. 28, 2012

Related U.S. Application Data

(60) Provisional application No. 61/427,060, filed on Dec. 23, 2010.

(51) Int. Cl.
*G06F 11/28* (2006.01)
*G06F 11/00* (2006.01)
*G06F 11/26* (2006.01)

(52) U.S. Cl.
CPC .............. *G06F 11/002* (2013.01); *G06F 11/26* (2013.01)
USPC ............. 702/183; 702/193; 700/79; 700/293; 714/37; 714/E11.178; 324/762.01

(58) Field of Classification Search
CPC .............................. G06F 11/26; G06F 11/002
USPC ............... 702/183, 193; 700/79, 293; 714/37, 714/E11.178; 324/762.01
See application file for complete search history.

(56) References Cited

U.S. PATENT DOCUMENTS

| | | | |
|---|---|---|---|
| 6,647,301 B1* | 11/2003 | Sederlund et al. | 700/79 |
| 7,245,216 B2* | 7/2007 | Burkley et al. | 340/539.13 |
| 7,496,483 B2* | 2/2009 | Pellegrino et al. | 702/193 |
| 7,568,000 B2* | 7/2009 | Keyes et al. | 709/200 |
| 8,287,454 B2* | 10/2012 | Wolpert et al. | 600/365 |
| 8,378,707 B2* | 2/2013 | Rivoir | 324/762.01 |
| 8,480,580 B2* | 7/2013 | Wolpert et al. | 600/365 |
| 2002/0091991 A1* | 7/2002 | Castro | 717/106 |
| 2007/0241261 A1* | 10/2007 | Wendt | 250/221 |
| 2008/0021436 A1* | 1/2008 | Wolpert et al. | 604/504 |
| 2008/0076997 A1* | 3/2008 | Peyser et al. | 600/345 |
| 2009/0143725 A1* | 6/2009 | Peyser et al. | 604/66 |
| 2011/0011399 A1* | 1/2011 | Wolpert et al. | 128/203.14 |
| 2011/0252132 A1* | 10/2011 | Wetzer et al. | 709/224 |
| 2011/0282508 A1* | 11/2011 | Goutard et al. | 700/293 |

* cited by examiner

*Primary Examiner* — Carol S Tsai
(74) *Attorney, Agent, or Firm* — John R. Pressetto; Frederick J. Telecky, Jr.

(57) ABSTRACT

An independently based diagnostic system tests the execution of a processor. The processor is arranged to provide a diagnostic output that provides a pre-determined time-variant signal. The independently based diagnostic system has an independent basis from which to evaluate the pre-determined time-variant signal. The independent basis can be, for example, an independent time base that is separately generated from the processor time base used to clock the processor and/or an independent voltage source that is separate from the processor power supply. The independently based diagnostic system provides progressive notifications of the results of successive evaluations of the pre-determined time-variant signal.

5 Claims, 5 Drawing Sheets

INDEPENDENTLY BASED DIAGNOSTIC MONITORING

CLAIM OF PRIORITY

This application for Patent claims priority to U.S. Provisional Application No. 61/427,060 entitled "Diagnostic Mechanism for Programmable Timing Co-Processors" filed Dec. 23, 2010, wherein the application listed above is incorporated by reference herein.

BACKGROUND

Safety regulations require that certain safety-related devices and systems be monitored to help ensure proper operation of the safety-related items. One source of errors for such equipment includes transients such as radiation-induced soft errors (SERs). SERs can occur at any time and may adversely affect the operation of a processor that is performing safely-related processing. Other sources of errors include permanent (e.g., Direct Current) errors and timing—(e.g., Alternating Current) based faults in logic.

Redundant logic is often used to verify the operation of the processor that is performing safely-related processing. However, using redundant logic to continuously generate comparison results that are used to verify proper operation of the processor is often relatively expensive because of the additional complexity required by the redundant logic and additional input/output (I/O) ports required. Additionally, there is additional concern for common-cause failures when redundant logic is used because failures are often not detected when the redundant logic responds to the common cause in the same manner. Thus, the approach of using and comparing the results of redundant logic would entail additional costs for verification of devices or systems that are performing safely-related functions and processes.

SUMMARY

The problems noted above are solved in large part by an independently based diagnostic system for testing, for example, the execution of a timing coprocessor. The timing coprocessor is arranged to provide a diagnostic output that provides a pre-determined time-variant signal. The time-variance in the timing coprocessor output provides an indication of the actual program sequence of the timing coprocessor to be monitored. As disclosed herein, the monitoring of the time-variant signal for time thresholds, time windows, and program sequences has increasing diagnostic value in the context of safety standards that often require real-time verification of safety-related processes. The independently based diagnostic system has an independent basis from which to evaluate the pre-determined time-variant signal. The independent basis can be, for example, an independent time base that is separately generated from the processor time base used to clock the processor and/or an independent voltage source that is separate from the processor power supply. The independently based diagnostic system provides progressive notifications of the results of successive evaluations of the pre-determined time-variant signal.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
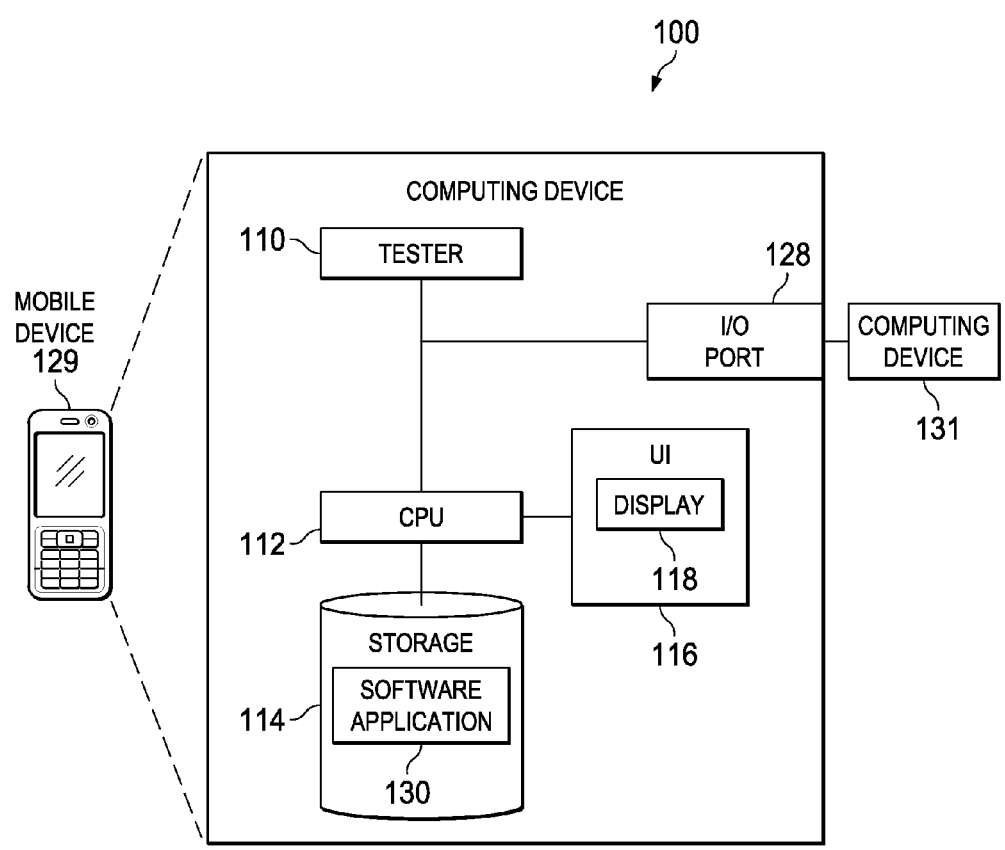
FIG. 1 shows an illustrative computing device 100 in accordance with embodiments of the disclosure.

FIG. 1 shows an illustrative computing device 100 in accordance with embodiments of the disclosure. For example, the computing device 100 is, or is incorporated into, a mobile communication device 129, such as a mobile phone, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100.

The tester 110 is a diagnostic system and comprises logic (embodied at least partially in hardware) that supports monitoring, testing, and debugging of the computing device 100 executing the software application 130. For example, the tester 110 can be used to emulate one or more defective or unavailable components of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio inputs (using, for example, voice recognition), and mechanical devices such as keypads, switches, proximity detectors, and the like. The CPU 112 and tester 110 is coupled to I/O (Input-Output) port 128, which provides an interface (that is configured to receive input from (and/or provide output to) peripherals and/or computing devices 131, including tangible media (such as flash memory) and/or cabled or wireless media (such as a Joint Test Action Group (JTAG) interface). These and other input and output devices are selectively coupled to the computing device 100 by external devices using wireless or cabled connections.

Various conditions and events and can cause failures in electrical systems (such as in computing device 100). The consequences of such failures are of elevated concern when the electrical systems in which the failures occur are performing safety-related processes. The safety-related processes include applications that require on-going monitoring and verification of the processor performing safety-related processes.

For example, flexible timing (co-) processors are on-board processors that are heavily used in automotive applications (such as braking) for timing capture, PWM (pulse-width modulation) generation, and basic I/O processing. Applicable safety standards often require the application of real-time diagnostics to monitor and verify the proper operation of the processors used to control safety-related processes. Implementing such diagnostics is becoming increasingly complex, as the logic-under-test used to implement the safety-related processer is designed to include increasingly more complex CPU-like architectures (as compared with single-function peripheral logic, for example).

Disclosed herein are illustrative techniques for using diagnostic hardware and software to monitor, for example, program flow and execution timing of programmable timer logic. A diagnostic output of the programmable timer is routed via a common substrate to monitoring logic that is arranged in the common substrate. (In an alternated embodiment, separate substrates are provided for the programmable timer logic and the monitoring logic.) Multiple software instructions are implemented on the programmable timer such that a diagnostic output of known value (e.g., predetermined) is generated. The diagnostic output (signal) includes a sequence of fixed frequencies, wherein the sequence of fixed frequencies is a sequence that comprises a single frequency, two frequencies, three frequencies, four frequencies, or more than four fixed frequencies. The sequence of fixed frequencies has increased diagnostic value because the sequence of fixed frequencies is produced in response to the correct execution of a program sequence. The monitoring logic detects and counts pulses on the diagnostic output using an independently based reference clock for comparison, and triggers an error notification if results are not within a predetermined range.

The monitoring logic may optionally include both a first and a second timing (co-) processor. As discussed further below, multiple I/O pins of the first and second timing processors can optionally be internally routed across a common substrate in which the two timing coprocessors are arranged. (In another embodiment, the two timing coprocessors are arranged in separated substrates.) More complex testing (such as cross-checking of the timing coprocessors for self-test of the monitoring logic and more complex waveform sequencing for diagnostic measurement.

Figure 2:
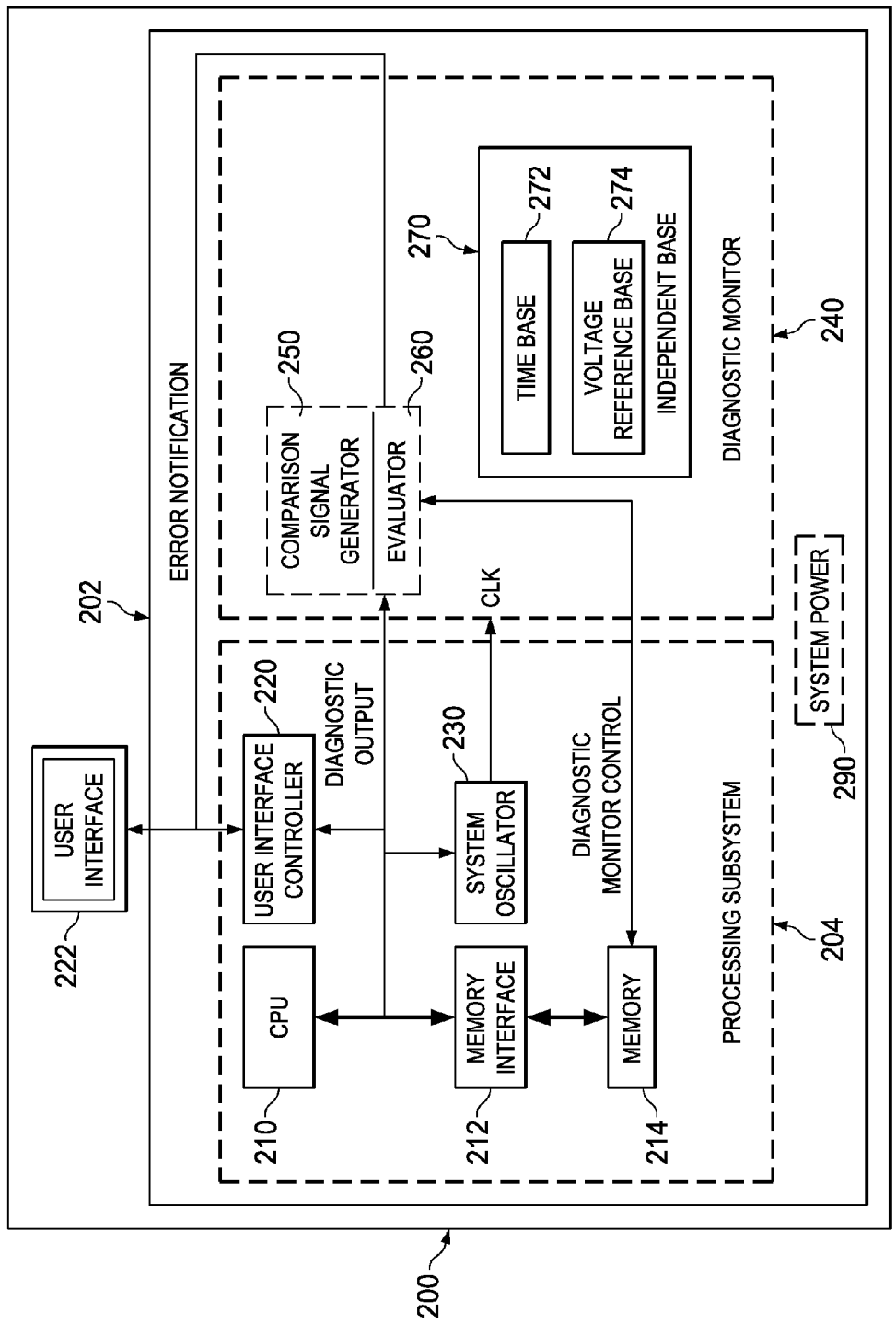
FIG. 2 is a schematic diagram illustrating a profile-based execution monitoring system in accordance with embodiments of the disclosure.

FIG. 2 is a schematic diagram illustrating a profile-based execution monitoring system in accordance with embodiments of the disclosure. Computing system 200 is illustrated as including a common substrate 202 upon which the illustrated elements of the computing system 200 are formed. Forming the illustrated elements of the computing system 200 on the common substrate 202 provides increased integration and reduces the number of connections for which drivers, bonding pads, and wiring would otherwise be used. In various embodiments, the included elements are implemented in separate circuit boards and packages (such as the user interface 222). System power 290 is used to power both the elements of substrate 202 and the user interface 222 (such as a dashboard indicator or a failure code reader interface), although the user interface 222 can be partially or completely powered by another power supply.

The processing subsystem 204 (which is also a processing system in its own right) of substrate 202 typically includes a CPU 210, a user interface controller 220, a system oscillator 230, an diagnostic monitor 240, and system power 290 (as described above). CPU 210 is a DSP, controller, microprocessor, or the like, and is used to control at least the processing subsystem 204. CPU 210 is typically coupled to a memory interface 212 that is arranged to control accesses to memory 214. The memory interface is additionally arranged to permit DMA ("direct memory accesses") of the memory 214 by subsystems such as the user interface controller 220 and diagnostic monitor 240 without intervention by the CPU 210. The memory 214 is arranged to store information used by CPU 210 (to control a braking process of a vehicle, for example) and information that is used for control and operational parameters for the diagnostic monitor 240 (to verify a diagnostic output of the processing subsystem 204).

The processing subsystem 204 is arranged to generate and provide a diagnostic output that is pre-determined and time-variant and includes a sequence of fixed frequencies. For example, the processing subsystem 204 is arranged to generate a known (e.g., determined beforehand) output at specific stages of a critical process. The diagnostic output is a waveform is generated having an output that has a state (such as a voltage level) that changes in response to arriving at specific task locations in code addresses and/or timings (as determined for example by a counter, programmed interrupt controller, execution of a number of machine cycles). The process of generating and providing the diagnostic output is, for example, realized at least in part as software code, which increases the flexibility of the diagnostic code to (for example) provide higher execution speeds and/or higher degrees of confidence of proper operation in accordance with a specific task to be performed.

Thus, evaluation of the diagnostic output allows a higher degree of confidence (and to meet safety regulations, for example) that the processing subsystem 204 is executing an assigned task according to schedule. For example, insertion of (unexpected) wait states due to an error condition during execution of the assigned task increases the number of machine cycles used to reach a specific task, and thus produces a change in the diagnostic output that is unexpected (e.g., not predicted beforehand).

The diagnostic output conveys the state of the operation of the processing subsystem 204 as, for example, a sequence of output frequencies (wherein the sequence can be a sequence of only one output frequency). The degree to which the frequency of the diagnostic output deviates from the expected output increases the likelihood that an error (e.g., an unexpected condition) has been encountered by the processing subsystem 204. (The diagnostic output can also convey the state of the operation of the processing subsystem 204 using other encoding techniques such as multi-bit quantization of voltage outputs, phase shifting/reversal, and the like).

The user interface controller 220 is arranged to prepare commanded information for display and to generate video control signals used to control the user interface 222 so that the commanded information can be displayed. Likewise, the user interface controller 220 is arranged to receive commanded information from a user via the user interface 222 so that the commanded information can be input to the CPU 210. In various embodiments, the user interface controller 220 is arranged to perform DMA accesses of memory and/or receiving commanded information from the CPU 210.

The diagnostic monitor 240 provides a degree of assurance that the processing subsystem 204 (such as CPU 210) continues to operate properly. The diagnostic monitor includes an evaluator 260 that is arranged to (at least) periodically monitor the diagnostic output of the processing subsystem 204. (The process can also be monitored continuously using, for example, an analog-based evaluator 260 as discussed with respect to FIG. 5, below). The evaluator 260 compares the received diagnostic output with an output provided by the comparison signal generator 250 to determine whether to provide an error notification.

The comparison signal generator 250 generates one or more comparison signals for comparing against the diagnostic output. In various embodiments, the comparison signal generator uses an independent base 270 to generate the comparison signals. For example, time base 272 is used to provide an independent frequency basis from which to evaluate frequencies of the diagnostic output (which provides a more robust defense against common timing errors where the diagnostic monitor 240 might be susceptible to the same timing errors generated from system oscillator 230 that also affect the CPU 210, which could mask detection of the timing errors). Likewise, voltage reference base 274 is used to provide an independent basis from which to evaluate voltages of the diagnostic output (which provides greater protection from common voltage problems from system power 290 that might mask detection of the error). The comparison signal can be generated by using the time base 272 and the voltage reference base 274 singly or in combination.

The safety-related processes include processes such as controlling a braking process for stopping a vehicle (e.g., to avoid locking the rotation of wheels of the vehicle while pressure is being applied to the brake pedal). Upon detecting an error in response to an evaluation of the diagnostic output, the diagnostic monitor 240 can, for example, output an error signal that is to be passed on to another microcontroller for further action, to activate an LED on the dashboard, and to provide a signal to electrically disable and/or reset the monitored system (and/or allow backup systems to operate) in the event of an error.

The diagnostic monitor 240 is arranged to receive commands from the CPU 210 or is pre-programmed (e.g., using "flash" memory) to provide metrics for the evaluation of the diagnostic output. In one example, the diagnostic monitor 240 measures the frequency of the diagnostic output and compares the results against associated thresholds for the selected events during a window of time. In such an arrangement, the processing resources of processing subsystem 204 are not used to monitor a diagnostic output. In various embodiments, the CPU 210 can perform the programming and reading of registers of the diagnostic monitor 240 (including programmable timing processors) for comparison of the ranges, and determining responses to event counts falling outside of a range specified by minimum and maximum values.

The diagnostic monitor 240 can also receive commanded information by performing DMA accesses of memory and/or receiving such information from the CPU 210. The memory accesses also can be used to perform and/or communicate the comparison thresholds and the results of monitoring of the diagnostic output over time.

The measure of confidence in derived from the diagnostic output can be increased or decreased based on the complexity of the waveform of the diagnostic output, selecting the times in which to perform the monitoring, and the degree of the ranges to be used for comparison of the results. The diagnostic monitor 240 applies the thresholds (of the allowable range, for example) on a frequency basis (see FIG. 3 and FIG. 4 below) and on a voltage basis (see FIG. 5 below).

Figure 3:
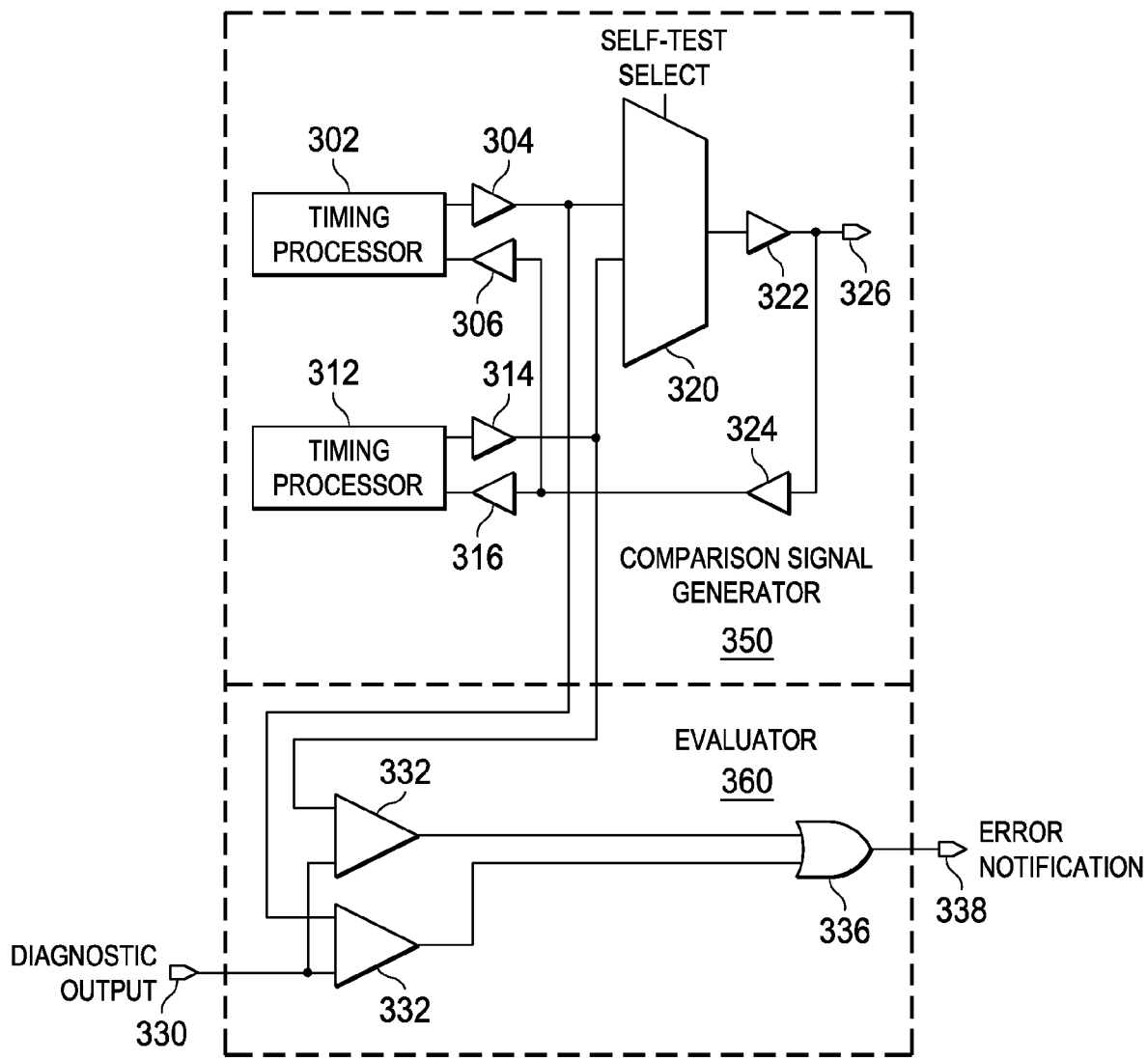
FIG. 3 is a block diagram illustrating a timing-based comparison signal generator and evaluator in accordance with embodiments of the disclosure.

FIG. 3 is a block diagram illustrating a timing-based comparison signal generator and evaluator in accordance with embodiments of the disclosure. Comparison signal generator 350 is a comparison signal generator 250 that is timing-based. Comparison signal generator 350 includes timing processors 302 and 312 that are programmable. The timing processors 302 and 304 can be programmed initially by the processing subsystem 204 to operate independently of the processing subsystem 204 to lessen operating requirements of the processing subsystem 204 and to enhance the independence of the operation of the comparison signal generator 350 to minimize the occurrence of common errors that might otherwise mask the detection of an error.

The timing processor 302 is arranged to produce output signals of a known frequency at an output that is coupled to buffer 304. Likewise, timing processor 312 is arranged to produce output signals of a known frequency at an output that is coupled to buffer 314. The timing processors 302 and 312 can be (initially) tested by, for example, using the processing subsystem 204 to verify the frequencies output by the timing processors. The output of a particular timing processor is selected using multiplexor 320 under the control of the self-test select signal. The selected input of multiplexor 320 is coupled to buffer 322. The output of buffer 322 is coupled to output node 326 (which is readable by the processing subsystem) and to the input of buffer 324.

The timing processors 302 and 312 are also configurable in a "loop-back" configuration. The input of timing processor 302 is coupled to buffer 306, which is in turn coupled to the output of buffer 324. The input of timing processor 312 is coupled to buffer 316, which is in turn coupled to the output of buffer 324. Thus, multiplexor 320 is used to select the timing processor that is used as the signal source in the loop-back configuration. The loop-back configuration is used to allow each timing processor to test the other timing processor, and is used to allow for generation of complex diagnostic waveforms that are used to evaluate complex waveforms of the diagnostic output.

Evaluator 360 is an evaluator 260 that is timing- (and/or frequency-) based. Evaluator 360 includes a pair of reference comparators 332. (Operation of the timing-based reference comparator 332 is described below with reference to FIG. 4.)

A first input of a first reference comparator 332 is coupled to the output of timing processor 302 (via buffer 304). A second input of the first reference comparator 332 is coupled to the diagnostic output received at input node 330. The first reference comparator 332 is arranged to compare the associated inputs and produce a result of the comparison that is provided as an input to a first input of logic gate 336.

A first input of a second reference comparator 332 is coupled to the output of timing processor 312 (via buffer 314). A second input of the second reference comparator 332 is coupled to the diagnostic output received at input node 330. The second reference comparator 332 is arranged to compare the associated inputs and produce a result of the comparison that is provided as an input to a second input of logic gate 336. Logic gate 336 is arranged to couple the results of the comparisons (e.g., provide a notification of an error) to the output node 338.

Figure 4:
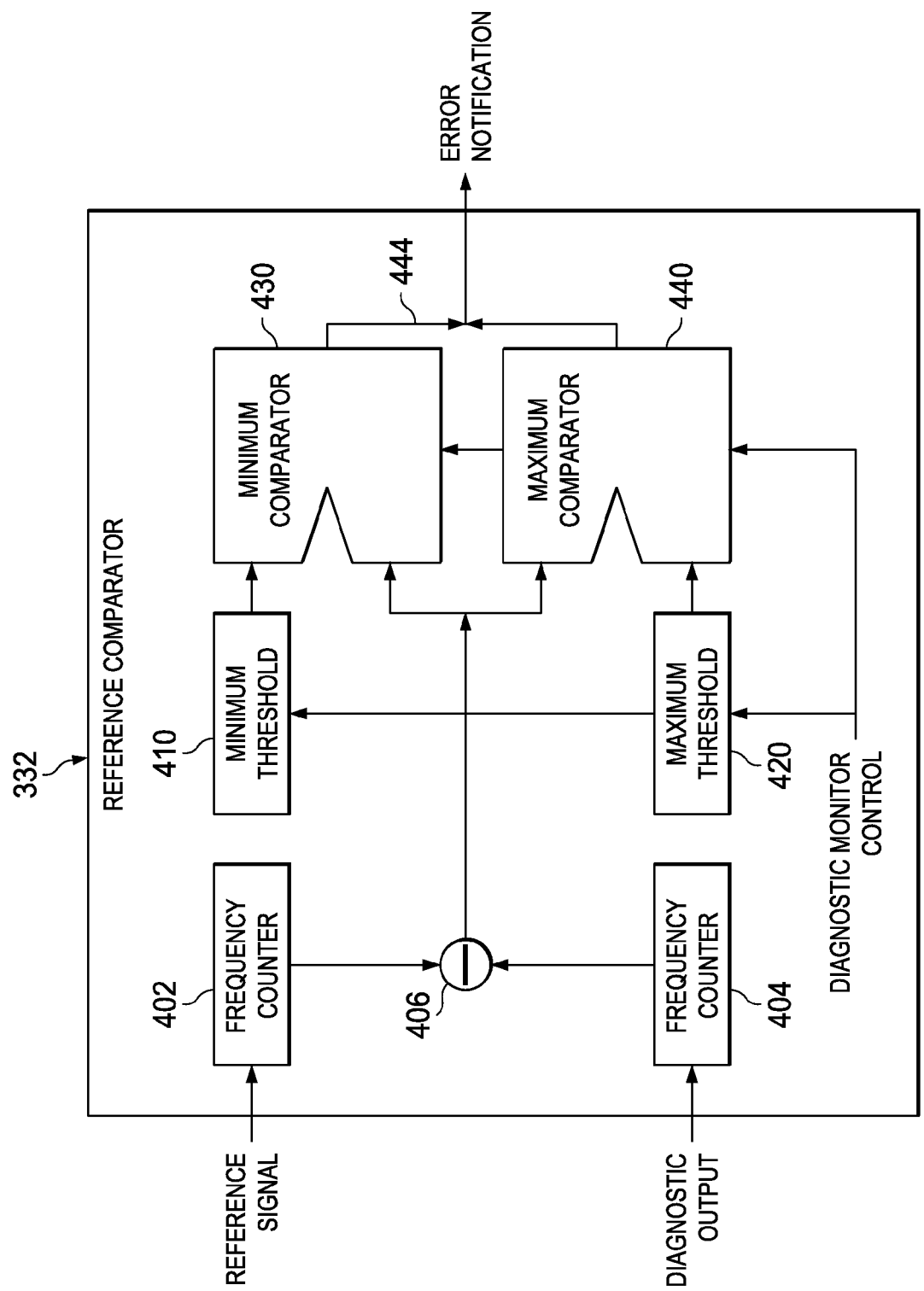
FIG. 4 is a block diagram illustrating a timing-based reference comparator in accordance with embodiments of the disclosure.

FIG. 4 is a block diagram illustrating a timing-based reference comparator in accordance with embodiments of the disclosure. Reference comparator 332 is arranged to receive a comparison signal (such as generated by comparison signal 350) at a first input and the diagnostic output at a second input. The first input of reference comparator 332 is coupled to frequency counter 402 that is arranged to determine the frequency of the comparison signal (by, for example, counting the number of pulses that occur in a period of time). The second input of reference comparator 332 is coupled to frequency counter 404 that is arranged to determine the frequency of the diagnostic signal.

The results of the values of frequency counter 402 and frequency counter 404 are coupled to summation node 406, where a difference (e.g., determined by subtraction) between the comparison signal and the diagnostic node output is determined. The output of summation node 406 is coupled to a first input of minimum comparator 430 and a first input of maximum comparator 440.

The minimum threshold register 410 is a register for storing a minimum value below which the difference between the comparison signal and the diagnostic output would likely indicate an error in the operation of processor subsystem 204. The maximum threshold register 420 is a register for storing the maximum value above which the difference between the comparison signal and the diagnostic output would likely indicate an error in the operation processor subsystem 204. The minimum threshold register 410 and the maximum threshold register 420 are initialized and controlled using the "diagnostic monitor control" signal.

The reference comparator 332 uses the minimum comparator 430 to compare the received the difference between the comparison signal and the diagnostic output against of the value stored in minimum threshold register 410. In a similar fashion, the reference comparator 332 uses the maximum comparator 440 to compare the difference between the comparison signal and the diagnostic output against the value stored in a maximum threshold register 420. Accordingly, the reference comparator 332 determines whether the difference between the comparison signal and the diagnostic output falls within a range having specified by the values stored in the minimum threshold register 410 and the maximum threshold register 420.

In various embodiments, the minimum threshold 410 and the minimum comparator (e.g., zero) can be eliminated when the difference between the comparison signal and the diagnostic output is expressed as a magnitude (e.g., by converting negative numbers into positive numbers). For example, the value by which the value of the frequency measurement the comparison signal exceeds the value of the frequency measurement the diagnostic output represents the same value by which the value of the frequency measurement the diagnostic output exceeds the value of the frequency measurement of the comparison signal. Thus a single threshold can be used for determining endpoints (that can be inclusive or exclusive endpoints of an allowable range.

The reference comparator 332 provides an error notification signal in response to the results of the comparison operations performed by minimum comparator 430 and maximum comparator 440. The error signal optionally includes results of the comparisons, including (for example) whether the event account (for the specific event associated with the event count) falls within or falls outside the specified range. In various embodiments, the error signal also includes a value by which the received event account exceeds (or falls short of) a specified threshold. The error notification signal (at node 444) is optionally coupled to the processing subsystem 204 and/or user interface 222.

Figure 5:
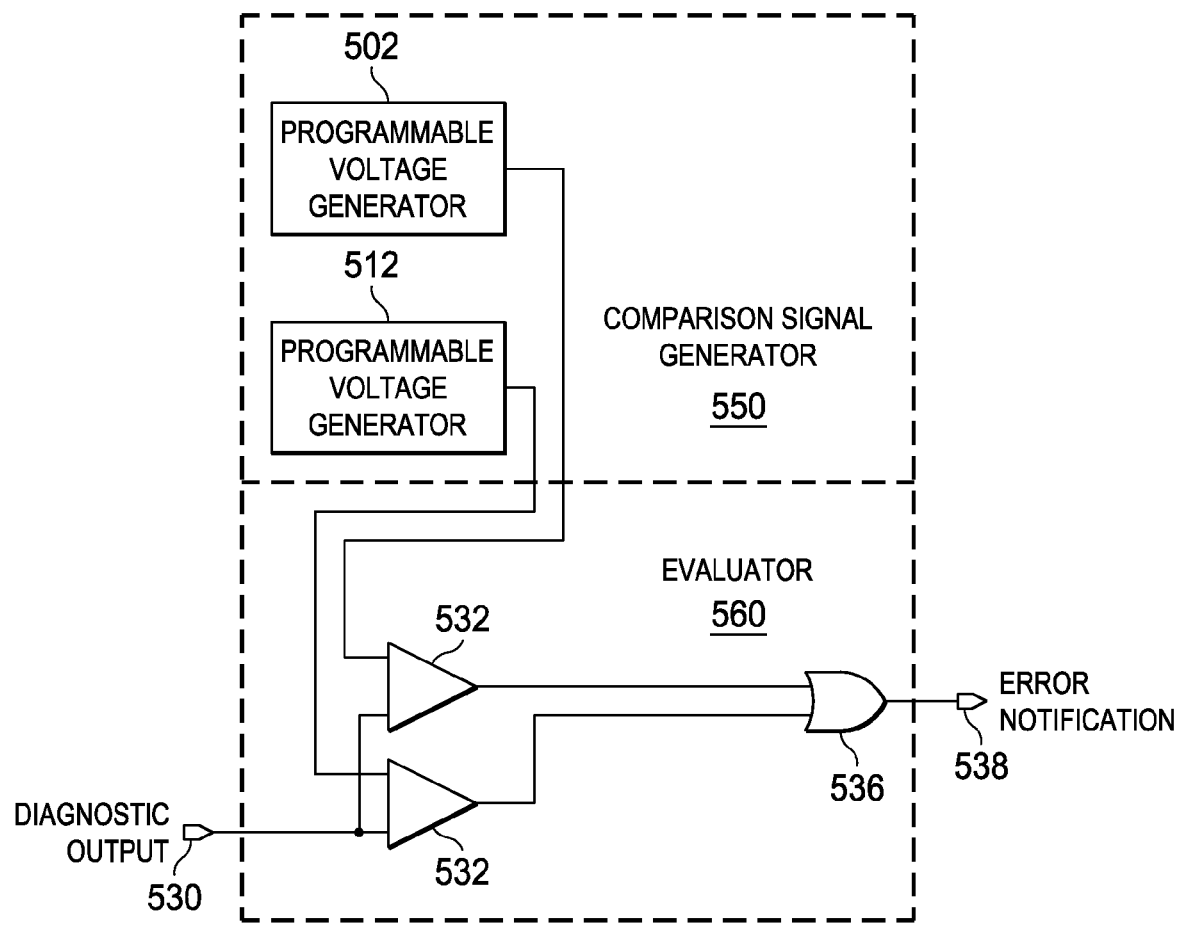
FIG. 5 is a block diagram illustrating a voltage-based comparison signal generator and evaluator in accordance with embodiments of the disclosure.

FIG. 5 is a block diagram illustrating a voltage-based comparison signal generator and evaluator in accordance with embodiments of the disclosure. The comparison signal generator 550 is a comparison signal generator 250 that is voltage-based. Comparison signal generator 550 includes programmable voltage generators 502 and 512 that include, for example, digital-to-analog converters (DACs). The programmable voltage generators 502 and 512 are configure to produce predetermined waveforms that is selected to, for example, produce a permissible upper limit and a permissible lower limit that are used to bound the extent of the waveform of the expected diagnostic output over time. (The waveforms can be generated using an addressable wavetable and clocking mechanism to provide data for the DACs, for example.) The programmable voltage generators 502 and 504 can be programmed initially by the processing subsystem 204 to operate independently of the processing subsystem 204 to lessen operating requirements of the processing subsystem 204 during normal operation and to enhance the independence of the operation of the comparison signal generator 550 to minimize the occurrence of common errors that might otherwise mask the detection of an error.

The programmable voltage generator 502 is arranged to produce an output signal of known voltages. Likewise, programmable voltage generator 512 is arranged to produce an output signal of known voltages. The timing processors 502 and 512 can be (initially) tested by, for example, using the processing subsystem 204 to using the diagnostic output (at node 530) to provide varying voltage. The output of each timing processor is (initially) tested by, for example, ramping the voltage output of each programmable voltage generator independently for comparison against the diagnostic output. The comparison is performed by voltage comparators 532. The outputs of voltage comparators 532 are coupled to logic gate 536. The output of logic gate 536 is coupled to the error notification node 538 (which is readable by the processing subsystem).

Evaluator 560 is an evaluator 260 that is voltage-based. Evaluator 560 includes a pair of reference comparators 532 that are used (in normal operation) to evaluate the voltages (over time) of the diagnostic output that is coupled to input node 530. A first input of a first reference comparator 532 is coupled to the output of programmable voltage generator 502. A second input of the first reference comparator 532 is coupled to the diagnostic output received at input node 530. The first reference comparator 532 is arranged to compare the associated inputs and produce a result of the comparison that is provided as an input to a first input of logic gate 536.

A first input of a second reference comparator 532 is coupled to the output of programmable voltage generator. A second input of the second reference comparator 532 is coupled to the diagnostic output received at input node 530. The second reference comparator 532 is arranged to compare the associated inputs and produce a result of the comparison that is provided as an input to a second input of logic gate 536. Logic gate 536 is arranged to couple the results of the comparisons (e.g., provide a notification of an error) to the output node 538. The outputs of logic gate 536 may be combined with the output of logic gate 336 (see FIG. 3) to provide a unified error notification, if desired.

Referring again to FIG. 2, the operation of the diagnostic monitor 240 is now described more fully. As discussed above, the diagnostic monitor 240 monitors the diagnostic output that is produces by processing subsystem 204. The diagnostic monitor 240 provides the setting of independent minimum and maximum thresholds for evaluation of the diagnostic output, adjusts the thresholds over time (if desired), successively evaluates the output diagnostic signal, and provides a notification of when the diagnostic output exceeds comparison thresholds. The tolerances of the thresholds can be selected to determine a confidence status that reflects a selected degree of confidence in the operation of the processing subsystem 204 (for example, by evaluating the likelihood of "false-positive" error messages against the likelihood and consequences of undetected failures).

The users and/or programmers can select (and/or modify) the thresholds (as well as which events to monitor) in order to obtain various degrees of confidence that it is plausible that the processing subsystem 204 is operating correctly. Thus, a level of confidence can be selected for any of several levels of safety-requirements that might be specified for a system, and the level of confidence can be dynamically adjusted during the operation of the system to meet the requirements of a particular operating profile. Thus, the selected level of confidence in the soundness in the operation of processing subsystem 204 can be selected by a customer programmer (for example) in view of the severity of the potential negative consequences of incorrect operation of processing subsystem 204.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. An independently based diagnostic system, comprising:
an evaluator that is arranged to receive a diagnostic output from a monitored processor, wherein the diagnostic output is a pre-determined time-variant signal, and wherein the evaluator is arranged to perform successive evaluations upon the received diagnostic output using a comparison signal;
a comparison signal generator that is arranged to independently generate the comparison signal using a basis that is generated independently of the monitored processor; and
a notification interface that provides progressive notifications of the results of successive evaluations of the diagnostic output;
wherein the evaluator and the notification interface are arranged in a common substrate with the monitored processor;
wherein the comparison signal generator is a timing processor that is arranged in a common substrate with the monitored processor.

2. An independently based diagnostic system, comprising:
an evaluator that is arranged to receive a diagnostic output from a monitored processor, wherein the diagnostic output is a pre-determined time-variant signal, and wherein the evaluator is arranged to perform successive evaluations upon the received diagnostic output using a comparison signal;
a comparison signal generator that is arranged to independently generate the comparison signal using a basis that is generated independently of the monitored processor; and
a notification interface that provides progressive notifications of the results of successive evaluations of the diagnostic output;
wherein the wherein the comparison signal generator includes a first timing processor and a second timing processor that are arranged to generate the comparison signal for evaluating a diagnostic signal that includes a complex waveform.

3. A processing system, comprising:
a monitored processor that is arranged to generate diagnostic output that is pre-determined and time-variant and includes a sequence of fixed frequencies;
a diagnostic monitor that is arranged to receive the diagnostic output from the monitored processor, to perform successive evaluations upon the received diagnostic output using a comparison signal includes a sequence of fixed frequencies, to independently generate the comparison signal using a basis that is generated independently of the monitored processor; and to provide progressive notifications of the results of successive evaluations of the pre-determined time-variant signal; and
a user interface that is arranged to operate in response to an indication of an error within the provided progressive notifications;
wherein diagnostic monitor is arranged to count pulses of the diagnostic output and a first comparison signal generated by a first timing processor and generate an error indication when the difference between the counted pulses of the diagnostic output and the counted pulses of the comparison signal fall outside of a predetermined range.

4. The system of claim 3, wherein diagnostic monitor is arranged to count pulses of the diagnostic output and a second comparison signal generated by a second timing processor and generate an error indication when the difference between the counted pulses of the diagnostic output and the counted pulses of the second comparison signal fall outside of a predetermined range.

5. A method for monitoring the execution of a safety-related processor, comprising:
receiving a diagnostic output from the safety-related processor, wherein the diagnostic output is a pre-determined time-variant signal;
performing successive evaluations upon the received diagnostic output using a comparison signal;
independently generating the comparison signal using a basis that is generated independently of the safety-related processor; and
providing progressive notifications of the results of successive evaluations of the diagnostic output;

wherein the basis that is generated independently of the monitored processor includes at least one of a frequency and a voltage level;

further comprising counting pulses of the diagnostic output and a first comparison signal generated by a first timing processor and generating an error indication when the difference between the counted pulses of the diagnostic output and the counted pulses of the comparison signal fall outside of a predetermined range.

* * * * *